(12) United States Patent
Ardes

(10) Patent No.: US 6,591,807 B1
(45) Date of Patent: Jul. 15, 2003

(54) COMBINATION COMPRISING A MAIN UNIT AND AT LEAST ONE ADD-ON FUNCTIONAL UNIT

(75) Inventor: Wilhelm Ardes, Ascheberg (DE)

(73) Assignee: Walter Hengst GmbH & Co KG, Muenster (DE)

(*) Notice: Subject to any disclaimer, the term of this patent is extended or adjusted under 35 U.S.C. 154(b) by 0 days.

(21) Appl. No.: 09/830,916
(22) PCT Filed: Sep. 2, 1999
(86) PCT No.: PCT/EP00/08295
§ 371 (c)(1), (2), (4) Date: Oct. 16, 2001
(87) PCT Pub. No.: WO01/18362
PCT Pub. Date: Mar. 15, 2001

(51) Int. Cl.$^7$ ............................... F02B 77/00
(52) U.S. Cl. ................. 123/198 R; 123/196 A
(58) Field of Search ............ 123/198 R, 196 A, 123/196 AB

(56) References Cited

U.S. PATENT DOCUMENTS

| | | | | |
|---|---|---|---|---|
| 3,561,417 A | * | 2/1971 | Downey | 123/196 AB |
| 4,426,965 A | * | 1/1984 | Patel | 123/196 AB |
| 4,831,980 A | * | 5/1989 | Nasu et al. | 123/196 A |
| 5,901,680 A | * | 5/1999 | Ozeki | 123/195 R |
| 5,922,196 A | * | 7/1999 | Baumann | 210/232 |
| 5,964,283 A | * | 10/1999 | Pavlin | 165/167 |
| 6,379,537 B1 | * | 4/2002 | Brieden et al. | 210/90 |

FOREIGN PATENT DOCUMENTS

| | | | | |
|---|---|---|---|---|
| JP | 06185332 A | * | 7/1994 | F01M/5/00 |
| JP | 06185333 A | * | 7/1994 | F01M/5/00 |

* cited by examiner

Primary Examiner—Tony M. Argenbright
Assistant Examiner—Katrina B. Harris
(74) Attorney, Agent, or Firm—Sonnenschein, Nath & Rosenthal

(57) ABSTRACT

The invention relates to a combination of a main unit, preferably the engine block of an internal combustion engine, and at least one add-on functional unit, preferably an oil filter or fuel filter or a heat exchanger or an oil mist separator, which can be added on to the liquid-carrying or gas-carrying main unit of which there is at least one; with the liquid or the gas also being able to flow through said main unit; with the main unit as well as the add-on functional unit comprising matching elements of a flange connection when adding the add-on functional unit, by forming at least one liquid or gas supply channel and one liquid or gas return channel, said elements engaging each other so as to provide a tight seal. The combination according to the invention is characterized in that the elements of the flange connection are formed not only by at least two parallel line connection pieces, mutually spaced apart, but also by two congruent line boreholes, and in that the flange connection in its connected state brought about by plugging it together, in addition comprises at least one radial seal arranged between the line connection piece and the associated line borehole.

5 Claims, 3 Drawing Sheets

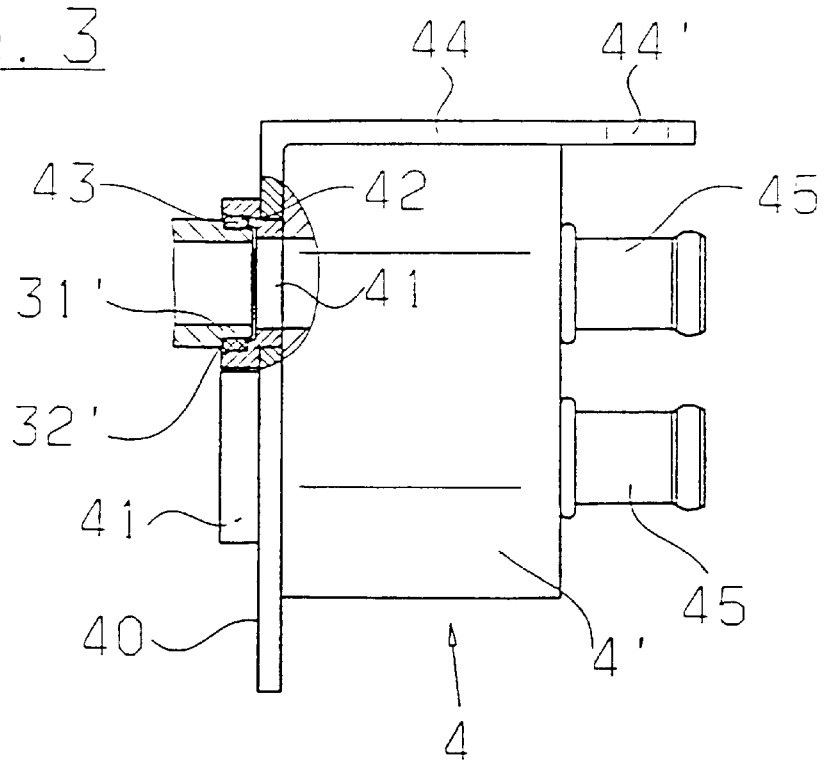

COMBINATION COMPRISING A MAIN UNIT AND AT LEAST ONE ADD-ON FUNCTIONAL UNIT

BACKGROUND OF THE INVENTION

The present invention relates to a combination of a main unit, preferably the engine block of an internal combustion engine, and at least one add-on functional unit, preferably an oil filter or fuel filter or a heat exchanger or an oil mist separator, which can be added on to the liquid-carrying or gas-carrying main unit of which there is at least one; with the liquid or the gas also being able to flow through said main unit; with the main unit as well as the add-on functional unit comprising matching elements of a flange connection when adding the add-on functional unit, by forming at least one liquid or gas supply channel and one liquid or gas return channel, said elements engaging each other so as to provide a tight seal.

Combinations of the type mentioned in the introduction are used in various fields of technology, with motor vehicle construction being one field where such combinations are frequently used. In these combinations there is the aim of being able to carry out the add-on as simply and easily as possible while at the same time providing permanent and reliable tightness of the connection. Generally in wide use and therefore well known are flange connections with area connection flanges which are sealed off by one or several interposed seals whose form is specially matched; said seals being mutually held together by means of several screws. A further combination of the type mentioned in the introduction is known from DE 195 39 918 C1. This publication describes a liquid filter, in particular for oil or fuel of an internal combustion engine, and a suitable filter connection flange which forms part of the internal combustion engine. The sealing faces at the filter connection flange of the internal combustion engine are radial seal faces arranged concentrically in respect of each other and the seals at the -filter housing are radial seals arranged concentrically in respect of each other. While this makes possible simple production and sealing of the connection, these flange connections just like the ones previously mentioned generally known flange connections are associated with the disadvantage that the flange connection elements have to be of considerable stability and rigidity so as to prevent eventual leaks at the flange connection elements due to loads experienced. This problem essentially occurs on the side facing the add-on functional unit, with at least that part of the unit which comprises the flange connection elements, having to be made from metal of adequate stability so as to safely meet the necessary requirements. When compared to a desirable design in a lighter material and in particular in a plastic material, such a design results in increased production costs and increased weight However, producing the respective parts from plastic has hitherto not been possible because if the metal had been substituted with plastic, over time the add-on functional unit would not have been able to withstand the occurring loads, and leaks or more severe damage may have occurred.

SUMMARY OF THE INVENTION

It is thus the object of the present invention to provide a combination of the type mentioned in the introduction, which avoids the disadvantages mentioned and which makes it possible in particular to produce a flange connection in a simple way, where permanent and reliable tightness of the connection is ensured, and in particular where the add-on functional unit, instead of being made from a stable metal, can also be made from a plastic material or a metal of lesser stability.

According to the invention, this object is met by a combination of the type mentioned in the introduction which is characterised in that the elements of the flange connection are formed not only by at least two parallel line connection pieces, mutually spaced apart, but also by two congruent line boreholes, and in that the flange connection in its connected state brought about by plugging it together, in addition comprises at least one radial seal arranged between the line connection piece and the associated line borehole.

Advantageously, the combination according to the invention is easy to make, namely by simply plugging it together. Production of the individual flange connection elements, too, is technically simple as it merely involves the drilling of boreholes on one side while on the other side it is merely necessary to provide for line connection pieces which are preferably all of identical design so as to simplify production thereof. In the combination according to the invention, the liquid pressures or gas pressures occurring when operating the combination, now have only a very slight effect on the quality and durability of the connection and its tightness. For, as a result of the smaller areas of the flange connection being exposed to pressure during operation, the loads occurring are respectively reduced. By using radial seals in all connections, their tightness does not depend on the axial forces applied; correspondingly only slight axial forces are required to hold the add-on functional unit to the main unit. To do so, e.g. fewer screws and/or weaker screws are now adequate; similarly it is not as a rule possible to do without metal sleeves embedded in the plastic, for attaching these screws. Thus it is now possible to use lighter materials than those stable materials which were hitherto used, in particular it is now possible to use plastics for producing the add-on functional unit. Apart from plastic, the light metal magnesium is a suitable material which is less strong than aluminium, but in the case of the combination according to the invention, due to the particular design of the flange connection elements, this is no disadvantage. The number of the channels routed through the flange connection according to the invention, as well as the media conveyed in those channels, depends on the purpose and the function of the combination. The invention it possible to achieve saving in weight and costs, which savings are particularly important in the production of vehicles.

Preferably, the line connection pieces are provided on the add-on functional unit while the line boreholes are provided on the main unit. In this way, production only requires simple cutting removal processes whereby only a relatively small amount of material needs to be removed by cutting because the flange connection elements are only slightly larger than are the line diameters of the channels which are connected to the flange connection elements.

Furthermore it is preferably provided that the add-on functional unit comprises a housing with a face wall that is flat on the outside, with all line connection pieces protruding the same distance from said face wall, and that the main unit comprises an opposite surface which is flat on the outside, in which all line boreholes are arranged so as to be opposed. Production is sped up and simplified in that all line connection pieces as well as all line boreholes can be made the same.

For securing the add-on functional unit in position after having been plugged onto the main unit, the face wall comprises one or several openings for placing mechanical connection elements, preferably bolts, which can be brought into disengageable engagement with the main unit.

In order to provide exact positioning of the radial seal during add-on and after add-on of the add-on functional unit, it is provided that the line boreholes and/or the line connection pieces each comprise a groove or step for accommodating the radial seal or for providing an end stop for said radial seal.

Preferably, the radial seals are standard O rings with only slight expenditure being involved for each single radial seal. There is thus no need for specially formed seals.

In a development of the invention, apart from a first add-on functional unit preferably an oil filter or fuel filter, a second add-on functional unit preferably an oil cooler or a fuel preheater is provided, with said second add-on functional unit in two separate regions comprising flange connection elements which are designed and arranged such that if required, the second add-on functional unit can be inserted between the main unit and the first add-on functional unit. Advantageously, the combination described here is a modular system which makes it possible to vary the combination without the need for changes in shape or treatment of the units involved.

An alternative embodiment of the combination according to the invention is characterised in that, apart from a first add-on functional unit which is preferably an oil filter or fuel filter, a second add-on functional unit which is preferably an oil cooler or a fuel preheater, is provided; in that said first add-on functional unit is connectable to the main unit and said second add-on functional unit is connectable to the first add-on functional unit, and in that the flange connection elements between the main unit and the first add-on functional unit as well as those between the first add-on functional unit and the second add-on functional unit are of identical construction. Here too there is the option of constructing the combination either with or without a second add-on functional unit. If the second add-on functional unit in the combination is not required, the provided flange connection elements of the first add-on functional unit can simply be closed off. If required, after removal of the closures, subsequently it is possible also to add the second add-on functional unit.

To prevent mechanical overload of the flange connection elements of the second add-on functional unit, as it can in particular occur in moving vehicles, it is useful if the second add-on functional unit comprises at least one support and attachment element arranged at a distance from its flange connection elements which is mechanically connectable via disengageable connection means, preferably bolts, to the main unit or to the first add-on functional unit.

BRIEF DESCRIPTION OF THE DRAWINGS

In the following, an example of the method and of the apparatus for the execution thereof are respectively explained on the basis of a drawing.

FIG. 3 illustrates a top view of the second add-on functional unit from FIGS. 1 and 2 on its own.

DETAILED DESCRIPTION OF THE PREFERRED EMBODIMENTS

Figure 1:
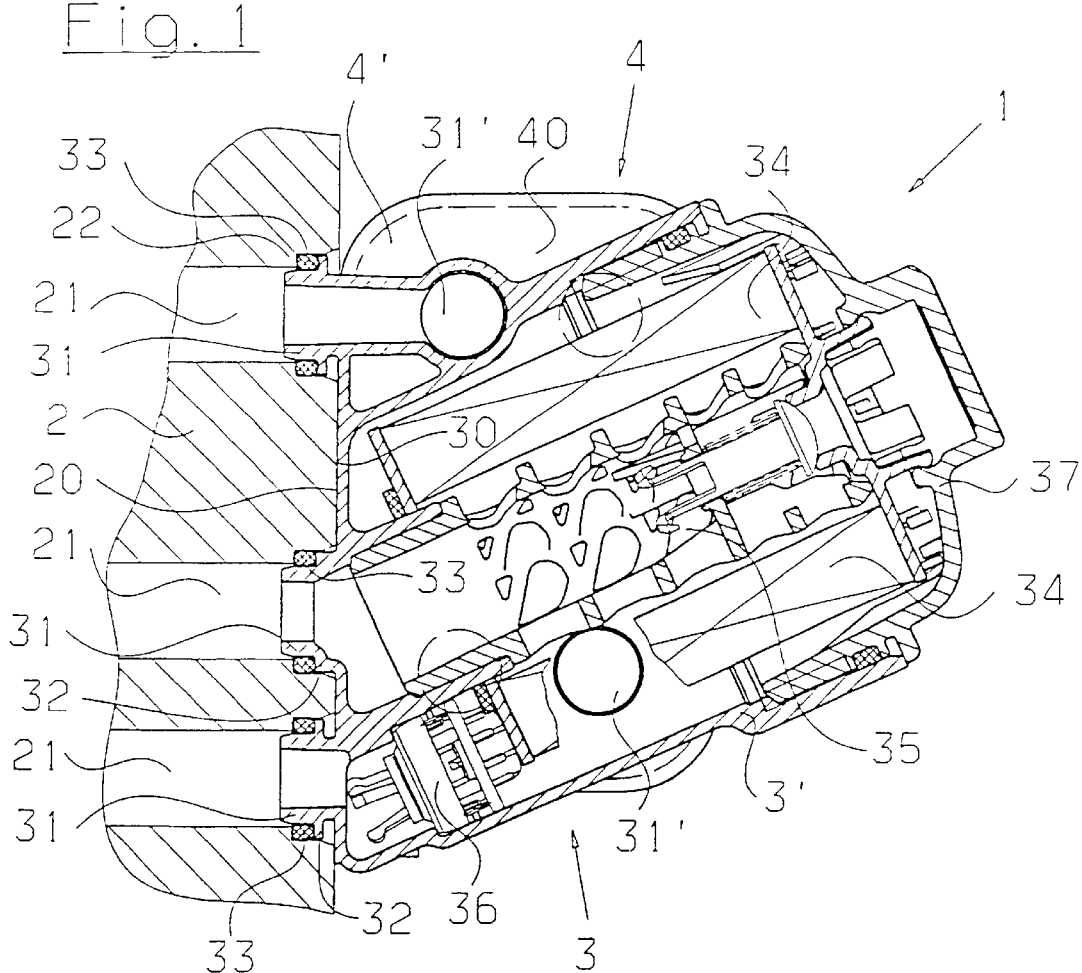
FIG. 1 illustrates a combination of a main unit and a first and a second add-on functional unit, in longitudinal section.

FIG. 1 of the drawing shows an example of a combination 1, comprising a main unit 2 and two add-on functional units 3, 4. In the embodiment shown, the main unit 2 is the engine block of an internal combustion engine which in this drawing is not shown in detail. The first add-on functional unit 3 is an oil filter; the second add-on functional unit 4 is a heat exchanger which in the present example is used for cooling the oil.

The main unit 2, which in the present example is the engine block, comprises three line boreholes 21 arranged parallel to each other and spaced apart from each other, and aligned at right angles to a plane face surface 20 at which surface 20 they exit. Near their outer extremity, the line boreholes 21 comprise a circumferential step 22, and at the very extremity a delivery slope.

The first add-on functional unit 3, in the present example an oil filter, comprises a housing 3' which in the assembled state as shown comprises a plane face wall 30 resting against the plane face surface 20 of the main unit 2. Three line connection pieces 31 protrude from this face wall 30 so as to be congruent with the line boreholes 21. In the assembled state shown in the present example, said line connection pieces 31 are plugged into the line boreholes 21. For sealing, a radial seal 33 has been provided between the line connection pieces 31 and the line boreholes 21. The steps 22 as well as a further step 32 each, on every line connection pieces are used for precise positioning of the radial seals 33. Preferably the radial seals 33 are standard O-rings.

The add-on functional unit 3 is disengageably connected to the main unit 2 via additional mechanical connection means (not shown in FIG. 1) and fixed in its position shown in FIG. 1.

In its interior, the first add-on functional unit 3 comprises the usual oil filter components, namely a filter insert 34, a central support body 35 arranged therein as well as a drain valve 36. The housing 3' is closed by means of a screw cap 37; it can be opened when required, so as to change the filter insert 34. When undoing the cap 37, the drain valve 36 moves to its open position, resulting in the filter housing 3' being emptied before the cap 37 is taken off. The lower channel shown in FIG. 1, said channel being formed by the lower line connection piece 31 and the associated line borehole 21, is used to empty the filter housing 3' in the context of changing the filter insert.

The upper channel shown in FIG. 1 which is formed by the upper line borehole 21 and the associated line connection piece 31, is used to supply to the oil filter 3 lubricating oil which is to be cleaned. On its way to said oil filter 3, the oil additionally flows through the second add-on functional unit 4 which in FIG. 1 is located in the background and is thus only partly recognisable. In the present example the add-on functional unit 4 is an oil cooler in which the oil temperature is reduced. After flowing through the oil cooler 4, the oil reaches the radially outer region of the interior of the housing 3' before flowing through the filter insert 34 into the central support body 35. Through the subsequent channel (the middle channel in FIG. 1) which is formed by the middle line connection piece 31 and the middle line borehole 21, the cooled and cleaned oil reaches the internal combustion engine again.

As is clearly shown in FIG. 1, all line connection pieces 31 of the first add-on functional unit 3 protrude by the same distance from the plane face wall 30 of said first add-on functional unit 3. This simplifies production and on the side facing the main unit 2 only requires uniform and simple cutting removal processes in the region of the line boreholes 21. If required, it is of course also possible for the individual line connection pieces and line boreholes to differ in length or diameter.

Furthermore, FIG. 1 shows that without any changes in the line boreholes 21 and the line connections 31 it is possible to use an add-on functional unit 3 on its own, i.e. without the second add-on functional unit 4. In this way it is possible with a minimum of expenditure to optionally construct the main unit 2 with only the first add-on functional unit 3, or with both the first add-on functional unit 3 and the second add-on functional unit 4.

Figure 2:
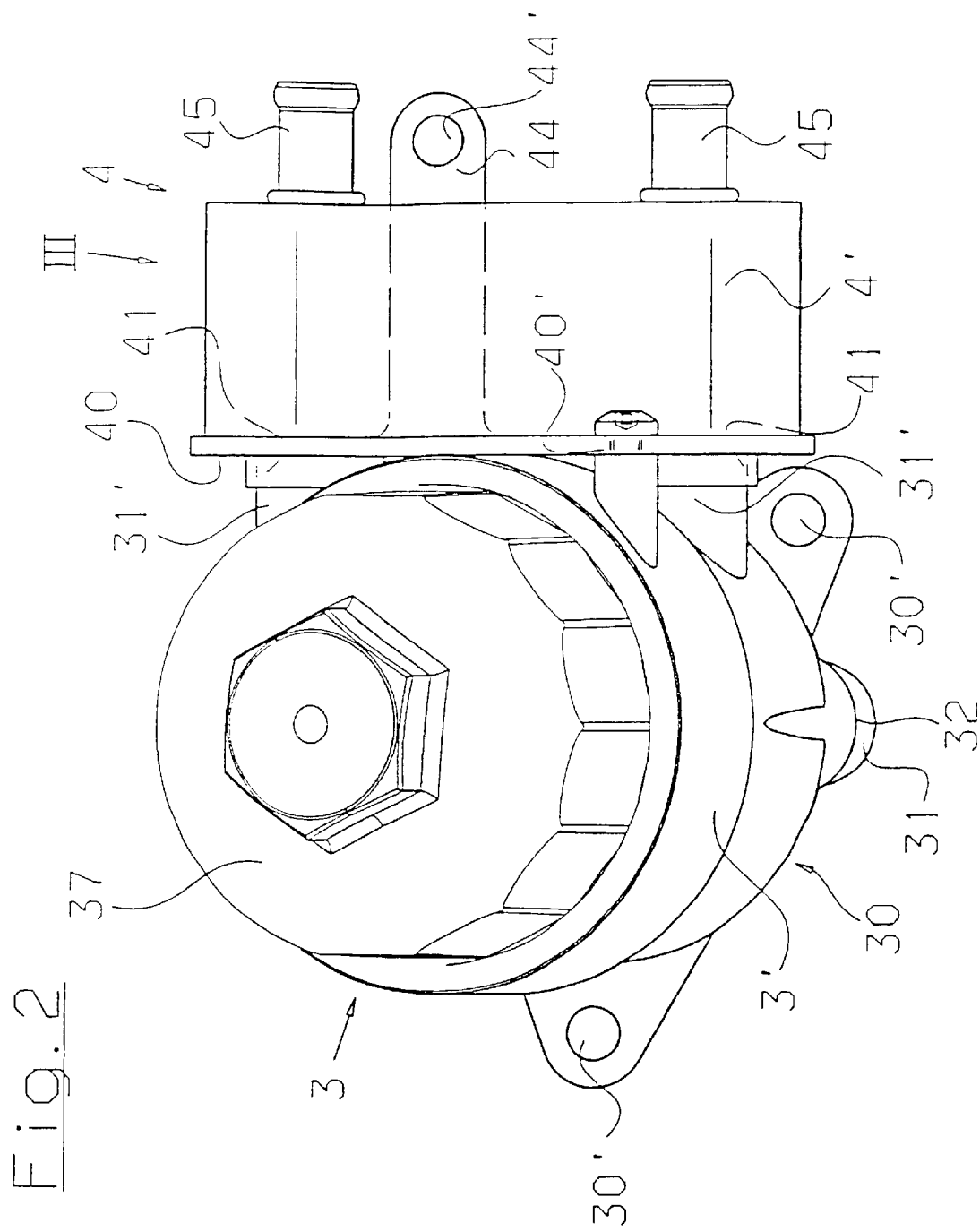
FIG. 2 illustrates a side elevational view of the combination from FIG. 1.

FIG. 2 shows the combination 1 from FIG. 1, with the main unit 2 not shown. On the left in FIG. 2, the first add-on functional unit 3 is shown, with the housing 3' located in the lower part and the cap 37 located in the upper part. On the bottom and away from the viewer is the plane face wall 30, which in several locations, preferably on three locations evenly spaced around the circumference of the housing 3', comprises protruding attachment elements with openings 30'. Disengageable connection means preferably screws, can be placed through the openings 30' into corresponding threaded holes in the main unit 2 (not shown) so as to safely provide mechanical interconnection of the two units.

On the right in FIG. 2, the second add-on functional unit 4 is shown, which on its side of the housing 4' facing left, comprises a plane face surface or a face wall 40. This face wall 40 comprises two line boreholes 41 which in their geometry correspond to the line boreholes 21 of the main unit 2. On the side of the first add-on functional unit 3, two line connection pieces 31' are formed so as to be congruent, with said line connection pieces 31' extending into the line boreholes 41, forming a sealed connection with them. An opening 40' in a region of the face wall 40 protruding from the housing 4'serves to mechanically connect the two parts, whereby a screw is placed through this opening 40' into a corresponding threaded hole in the housing 3' of the first add-on functional unit 3.

On its side facing right, the housing 4' of the second add-on functional unit 4 comprises two hose connection pieces 45 which are provided to establish line connections for the supply and removal of a second liquid, for example coolant. As an alternative to the embodiment shown, apart from the two line boreholes 41 two further line boreholes and correspondingly in the first add-on functional unit 3 two further line connection pieces apart from the line connection pieces 31', can be provided for the supply and removal of the second liquid. To this effect, two further flange connections would have to be provided between the main unit 2 and the first add-on functional unit 3; as well as within the first add-on functional unit 3, two channels for the second liquid would have to be provided. In this way it would be possible to do entirely away with any hose connections.

In the embodiment shown, the second add-on functional unit 4 comprises a support and attachment element 44 with an opening 44' provided at its extremity. This element 44 serves to mechanically fix the second add-on functional unit 4 to the main unit 2 (not shown) and at the same time to mechanically relieve the flange connection formed by the line connection pieces 31' and the line boreholes 41. To this purpose, the support and attachment element 44 has intentionally been provided as far away from the line boreholes 41 as possible.

FIG. 3 of the drawing is an individual top view, partly cut away, of the second add-on functional unit 4. In the center of FIG. 3, the housing 4' of the second add-on functional unit 4 is shown, with said housing 4' at its left side comprising the plane face wall 40. This is where the line boreholes 41 have been provided, which, as is shown in the sectional view of the upper line borehole 41, are also constructed so as to comprise a step 42. The upper line borehole 41 also shows a short section of the associated line connection piece 31' of the first add-on functional unit 3 (not shown in detail). On the line connection piece 31', too, a step 32' has been provided, so as to safely and precisely position an interposed radial seal 43.

On the extreme right of FIG. 3, the two hose connection pieces 45 for the second liquid are shown. At the very top of FIG. 3, the support and attachment element 44 with its opening 44' provided on one of its extremities, extends. In the embodiment shown, this element 44 is made in one piece together with the face 40 of the second add-on functional unit 4.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

What is claimed is:

1. A combination of a fluid carrying main unit and at least one fluid carrying add-on functional unit, wherein in said add-on functional unit comprises an oil mist separator, which can be added on to the main unit; the main unit and the add-on functional unit comprising matching elements of a flange connection when the add-on functional unit is attached to the main unit, said elements forming at least one fluid supply channel and at least one fluid return channel, said elements engaging each other so as to provide a tight seal therebetween, wherein the elements of the flange connection are formed by at least two parallel line connection pieces, mutually spaced apart, and by an equal number of congruent line boreholes, and the flange connection comprises at least one radial seal arranged between each line connection piece and an associated line boreholes.

2. A combination of a fluid carrying main unit and at least one fluid carrying add-on functional unit which can be added on to the main unit; the main unit and the add-on functional unit comprising matching elements of a flange connection when the add-on functional unit is attached to the main unit, said elements forming at least one fluid supply channel and at least one fluid return channel, said elements engaging each other so as to provide a tight seal therebetween, wherein the elements of the flange connection are formed by at least two parallel line connection pieces, mutually spaced apart, and by an equal number of congruent line boreholes, and the flange connection comprises at least one radial seal arranged between each line connection piece and an associated line borehole, wherein in addition to said first add-on functional unit, a second add-on fluid carrying functional unit is provided, wherein said second add-on functional unit, in two separate regions, comprising flange connection elements which are designed and arranged such that the second add-on functional unit can be inserted between the main unit and the first add-on functional unit.

3. A combination of a fluid carrying main unit and at least one fluid carrying add-on functional unit which can be added on to the main unit; the main unit and the add-on functional unit comprising matching elements of a flange connection when the add-on functional unit is attached to the main unit, said elements forming at least one fluid supply channel and at least one fluid return channel, said elements engaging each other so as to provide a tight seal therebetween, wherein the elements of the flange connection are formed by at least two parallel line connection pieces, mutually spaced apart, and by an equal number of congruent line boreholes, and the flange connection comprises at least one radial seal arranged between each line connection piece and an associated line borehole, wherein in addition to said first add-on functional unit, a second add-on fluid carrying functional unit is provided, wherein said second add-on functional unit comprises a fuel preheater.

4. A combination of a fluid carrying main unit and at least one fluid carrying add-on functional unit which can be added on to the main unit; the main unit and the add-on functional unit comprising matching elements of a flange connection when the add-on functional unit is attached to the main unit, said elements forming at least one fluid supply channel and at least one fluid return channel, said elements engaging each other so as to provide a tight seal therebetween, wherein the elements of the flange connection are formed by at least two parallel line connection pieces, mutually spaced apart, and by an equal number of congruent line boreholes, and the flange connection comprises at least one radial seal arranged between each line connection piece and an associated line borehole, wherein in addition to said first add-on functional unit, a second add-on fluid carrying functional unit is provided, wherein said second add-on functional unit is connectable to the first add-on functional unit, as well as those between the first add-on functional unit and the second add-on functional unit, are of the same general type of construction.

5. A combination according to claim 4, wherein the second add-on functional unit comprises at least one support and attachment element arranged at a distance from its flange connection elements which is mechanically connectable via a disengageable mechanical connection element to one of the main unit and the first add-on functional unit.

* * * * *